Figures 1, 2:
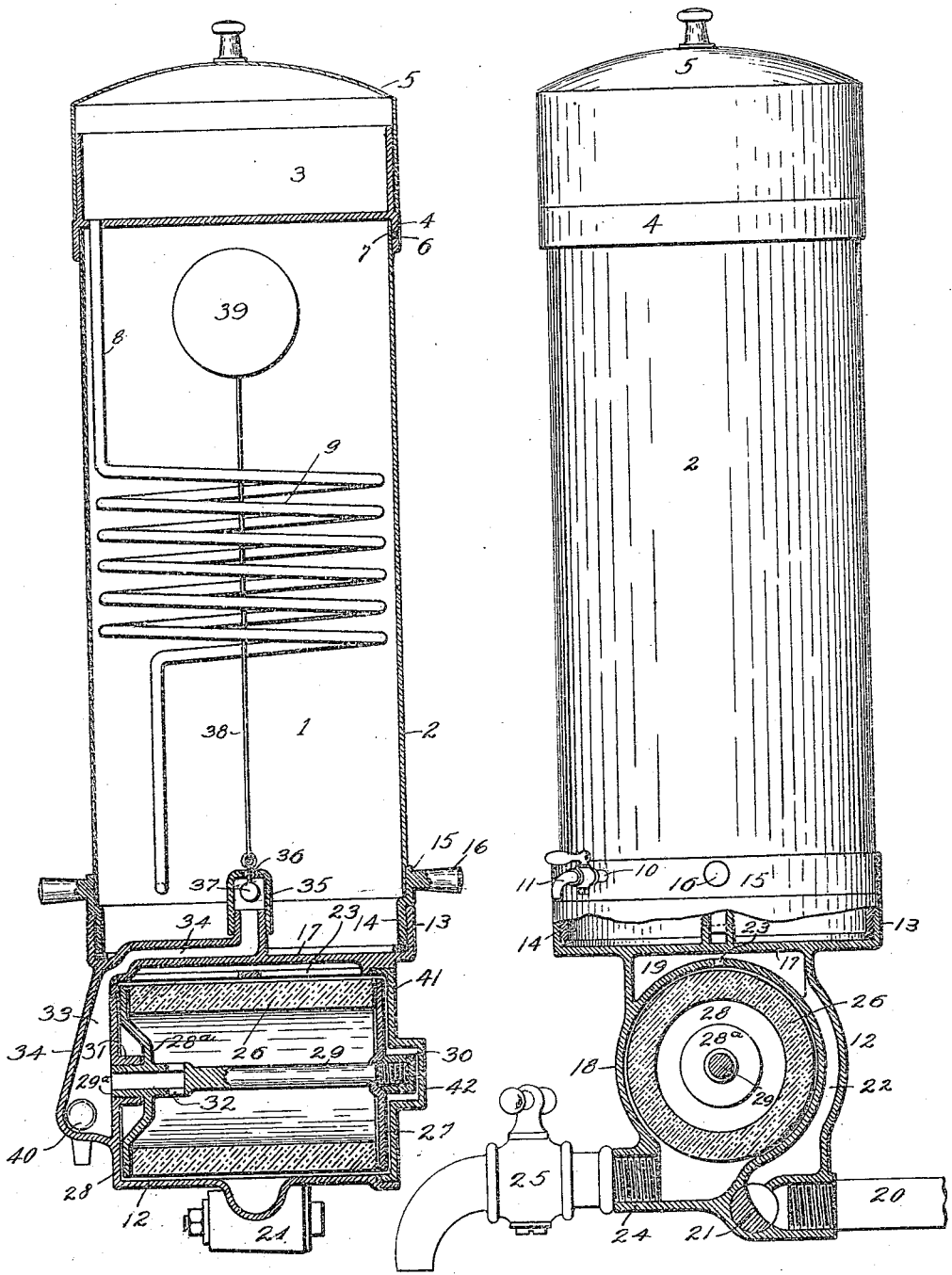

UNITED STATES PATENT OFFICE.

HANS BRUNNER, OF SPOKANE, WASHINGTON.

FILTER.

960,267.  Specification of Letters Patent.  Patented June 7, 1910.

Application filed October 23, 1908. Serial No. 459,242.

*To all whom it may concern:*

Be it known that I, HANS BRUNNER, a citizen of Switzerland, residing at Spokane, in the county of Spokane and State of Washington, have invented a certain new and useful Improvement in Filters, of which the following is a full, clear, and exact description, reference being had to the accompanying drawings.

This invention relates to filters and has for its objects to provide an improved construction of filter which will effectively remove sediment from the liquid supplied thereto, in which provision is made for drawing off the liquid before it has passed through the filter body without interrupting the filtering operation, for the purpose of furnishing liquid either in a filtered or nonfiltered state, as required for use.

A further object of the invention is to provide a construction of filter which will effectively utilize the inflowing liquid as a means for removing the coating or deposit of sediment which may accumulate on the surface of the filter body and more especially to apply the liquid in such manner as will constantly cleanse the surface of such body, without interfering with or interrupting the filtering operation.

A still further object of the invention is to provide a construction of filter which is readily assembled and disassembled, and which is compact and economical of production.

Generally speaking, the invention may be defined as consisting of the combinations of elements embodied in the claims hereto annexed and illustrated in the drawings forming a part hereof, wherein—

Figure 1 represents a vertical sectional view through a filtering apparatus constructed in accordance with my invention, and Fig. 2 represents a view, partly in section and partly in elevation, of the apparatus shown in the preceding figure, the parts being arranged at right angles with respect to their positions as shown in Fig. 1.

While my filter is admirably adapted for use in connection with water, it will be understood that features of construction thereof may be employed in connection with other liquid or liquids.

Describing the parts by reference characters, 1 denotes a receptacle for the filtered liquid, said receptacle comprising a vertically extending cylindrical casing 2, said casing carrying at its upper end a receptacle 3, which is preferably separable from the casing 2 and rests on top of said casing to form a closure therefor. The receptacle 3 is provided with a downwardly projecting flange 4 by means of which it is retained on top of the casing 2 and with a removable cover 5. The flange 4 is provided with a vent aperture 6 extending therethrough and registering with a similar aperture 7 in the casing 2.

8 denotes a pipe which extends through the bottom of the receptacle 3 and is formed into a coil 9 within the casing 2. The lower end of the pipe 8 projects through the bottom of the casing, as shown at 10, and is provided with a faucet 11, for a purpose to be described hereinafter.

12 denotes a bottom closure for the receptacle 1, said closure comprising a casting which is detachably connected to the bottom of the casing 2. This casting is provided with an upwardly projecting flange 13, said flange being provided with an internal thread adapted to receive a corresponding external thread formed on a sleeve 14, said sleeve depending from a ring 15 which receives the lower end of the casing 2, said ring being provided with operating handles 16 by means of which said ring may be connected to and disconnected from the flange 13.

The casting 12 is provided with a wall 17 which forms a bottom for the receptacle 2. Depending from the wall 17 is a cylindrical casing 18, said casing being preferably formed as part of the aforesaid casting 12. The casing 18 extends horizontally across the bottom of the receptacle 2 beneath the partition 17, a receiving and distributing chamber 19 being formed between the top of casing 18 and the partition 17. At one side, the casting 12 is provided with an inlet connection 20 communicating through a valve 21 with an upwardly extending passageway 22, which merges at its upper end with the chamber 19.

23 denotes a slotted outlet from chamber 19 communicating with the interior of the cylindrical casing or filter chamber 18. At the lower end of the chamber 18 and projecting in the opposite direction from connection 20 is an outlet connection 24 which may be provided with a faucet 25.

Within the chamber 18 is mounted the filter body 26, said body being cylindrical in form and being composed preferably of porous, unglazed porcelain. The filter body 26 is conveniently supported within the casing 18 by being clamped between two heads 27 and 28. The former head is provided with a central aperture for the reception of the threaded end of a bolt 29, being tapered inwardly at said aperture to form a seat for the correspondingly tapered end of a nut 30. The head 28 is conveniently formed with the bolt 29 and said head is provided with a central inwardly projecting portion 28$^a$ to permit the threaded end 29$^a$ of the bolt 29 to be threaded into the internally threaded sleeve 31 on the adjacent head of casing 18. The end of bolt 29 which is opposite the nut 30 is preferably tubular and is provided with a suitable number of apertures 32, and the end of the tubular portion of said bolt communicates with a chamber 33 formed between the head of the chamber 18 and an outwardly projecting portion 34 of the casting 12. This chamber 33 communicates with a passageway 34 which may be conveniently formed with the partition 17 and projects upwardly and is provided on such upwardly projecting portion with a nipple 35 having an aperture 36 for the stem of a valve 37. This valve is connected by a rod 38 with a float 39. The chamber 33 is provided with a faucet 40.

For convenience of inserting the filter body into and removing the same from the chamber 18, the end of the casting 12 opposite the chamber 33 is provided with a removable head 41, which may be threaded into a suitable seat in said casting. The head 41 is provided with a central hollow projection 42 which receives the end of bolt 29 and the nut 30 thereon. This projection will be preferably squared for the reception of a wrench. To remove the filter body, it will be only necessary to unscrew the head 41 and nut 30, whereupon the head 27 and the filter body may be easily withdrawn from the chamber 18. Also by rotating the bolt 29 in the appropriate direction, said bolt and the head 28$^a$ may be removed from the casing 12.

The operation of my filter is as follows: Upon opening the valve 21, the water or other liquid supplied through said valve will pass upwardly through the passageway 22 into the chamber 19 which is formed beneath the removable bottom of the receptacle. In this chamber, the liquid spreads out to substantially the full length of the filter body 26 and is discharged upon the outer surface of such body through the elongated port 23. The faucet 25 being closed, the filter body is subjected uniformly throughout its extent to the pressure of the head of the liquid, with the result that the liquid is quickly filtered through the wall of the filter body into the inner chamber thereof, whence it flows through ports 32 into the passageway 33 and through the valve-controlled opening 36 into the receptacle 2. To prevent the liquid from overflowing through the vent openings 6 and 7, the float 39 is provided, by means of which the valve 37 closes the port 36 before the liquid in the receptacle 2 can reach a level which will cause it to overflow through the vent openings 6 and 7. When it is desired to draw unfiltered water from my apparatus, this result can be accomplished by opening the faucet 25. The water supplied to the casing 18 which surrounds the filter body will flow directly through the faucet without passing through such body and in its flow will effectually cleanse the outer surface of the filter body, over which it is spread in a thin, rapidly moving sheet. The filtered water will be drawn off through the faucet 40. By closing the valve 21 and faucet 40 and opening the faucet 25, the water in the tank 2 will flow into the interior of the filter body and will pass outwardly through said body, effectually cleansing the body and removing from its pores any sediment that may have accumulated therein. For the purpose of cooling the liquid, the pipe 8 having therein the coil 9 is employed. The upper end of this pipe communicates with the receptacle 3 which forms a top for the casing 2. Ice will be placed in the receptacle 3 and as it melts it will flow down through the pipe 8 and its coil 9, and may be drawn from said coil through the faucet 10.

Having thus described my invention, what I claim is:

1. In a filter, the combination of a receptacle having a bottom closure, said closure being provided with a depending casing, said casing having formed therewith a partition and a distributing chamber and a filter chamber, the distributing chamber being arranged beneath the partition and provided with a discharge slot in its bottom communicating with the filter chamber, a filter body in the filter chamber, a connection leading from the interior of said filter chamber to said receptacle, and an inlet connection communicating with the former chamber.

2. In a filter, the combination of a receptacle having a removable bottom closure, said closure being provided with a depending casing, said casing being provided with a distributing chamber in the upper portion thereof and a filtering chamber beneath the former chamber and communicating therewith and with an inlet passageway extending from the former chamber to the lower portion of the casing and there communicating with an inlet connection, said casing also having an outlet connection communicating with the interior of the filter chamber and extending upwardly into the receptacle, and a hollow filter body within the filter chamber, said casing having an outlet connection communicating with the filter chamber of said filter body.

3. In a filter, the combination of a receptacle having a bottom closure, said closure having a depending casing, said casing being provided with a distributing chamber and a filter chamber, the latter chamber being provided with heads, a hollow filter body within the filter chamber, the latter chamber being provided with an outlet connection communicating with the central portion of one of its heads and with the receptacle, an inlet connection communicating with the distributing chamber, and a faucet communicating with said filter chamber.

4. In a filter, the combination of a receptacle, a casing having a chamber beneath said receptacle, said casing having an inlet connection at one side and near the bottom thereof and having an outlet connection at the opposite side and near the bottom thereof, a hollow filter body mounted in said chamber, a distributing chamber in said casing above the filter chamber and communicating therewith, a passageway extending from the inlet connection to the distributing chamber, and a passageway in the casing extending from the interior of the filter body to the receptacle.

In testimony whereof, I hereunto affix my signature in the presence of two witnesses.

HANS BRUNNER.

Witnesses:
   P. E. Fenstermacher,
   A. M. Crommett.